(12) United States Patent
Londiche et al.

(10) Patent No.: US 10,408,490 B2
(45) Date of Patent: Sep. 10, 2019

(54) AIR VENT

(71) Applicant: Faurecia Innenraum Systeme GmbH, Hagenbach (DE)

(72) Inventors: Stephane Londiche, Montmagny (FR); Volker Doll, Ranschbach (DE); Julien Seiller, Munich (DE); Martin Schulz, Karlsruhe (DE)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 546 days.

(21) Appl. No.: 15/077,367

(22) Filed: Mar. 22, 2016

(65) Prior Publication Data

US 2016/0200178 A1 Jul. 14, 2016

Related U.S. Application Data

(63) Continuation of application No. 14/278,865, filed on May 15, 2014, now Pat. No. 9,513,027.

(30) Foreign Application Priority Data

May 29, 2013 (DE) .................. 10 2013 210 055

(51) Int. Cl.
*F24F 13/10* (2006.01)
*B60H 1/34* (2006.01)
*B64D 13/00* (2006.01)
*F24F 13/072* (2006.01)
*B64D 13/06* (2006.01)

(52) U.S. Cl.
CPC ........... *F24F 13/10* (2013.01); *B60H 1/3414* (2013.01); *B60H 1/3421* (2013.01); *B64D 13/00* (2013.01); *F24F 13/072* (2013.01); *B60H 2001/3478* (2013.01); *B64D 2013/0625* (2013.01)

(58) Field of Classification Search
CPC .. B60H 1/00564; B60H 1/00871; B60H 1/34; B60H 1/3414; B60H 1/345; B60H 2001/00092; B60H 2001/00214; B60H 2001/3478; B60H 2001/3492; B60H 1/3421; B64D 2013/0625; B64D 13/00;
(Continued)

(56) References Cited

U.S. PATENT DOCUMENTS 3,101,038 A 8/1963 Archer
3,908,528 A 9/1975 Bertin et al.
(Continued)

FOREIGN PATENT DOCUMENTS

DE 102006032587 A1 1/2008
DE 102007019602 B3 6/2008
(Continued)

*Primary Examiner* — Gregory L Huson
*Assistant Examiner* — Dana K Tighe
(74) *Attorney, Agent, or Firm* — Reising Ethington P.C.

(57) ABSTRACT

An air vent includes air-conveying surfaces in a housing arranged to guide separate first and second volumetric flows of air through the housing from an inlet end to a discharge end via respective first and second air channels. The air channels are arranged so that the first and second volumetric flows of air exit an air discharge opening in intersecting directions and collide after exiting the housing. The air vent includes an air flow adjustment element that is movable to change a ratio of the first volumetric flow to the second volumetric flow.

20 Claims, 4 Drawing Sheets (58) Field of Classification Search
CPC .......... F24F 7/04; F24F 13/072; F24F 13/075;
F24F 13/10
USPC ........ 454/143, 152, 153, 154, 155, 284, 322
See application file for complete search history.

(56) References Cited

U.S. PATENT DOCUMENTS

| | | | |
|---|---|---|---|
| 4,345,510 | A | 8/1982 | Sterett |
| 5,356,336 | A | 10/1994 | Stouffer et al. |
| 6,715,814 | B1 * | 4/2004 | Hoyle ................. B60H 1/0055 296/24.36 |
| 7,604,533 | B2 | 10/2009 | Ogura et al. |
| 9,163,848 | B2 | 10/2015 | Doll et al. |
| 2004/0152412 | A1 | 8/2004 | Gehring et al. |
| 2008/0014855 | A1 | 1/2008 | Leserre |
| 2008/0081550 | A1 | 4/2008 | Shibata et al. |
| 2008/0146139 | A1 | 6/2008 | Terai et al. |
| 2010/0011799 | A1 | 1/2010 | Sakakibara |
| 2010/0130115 | A1 | 5/2010 | Miki |
| 2010/0263401 | A1 | 10/2010 | Sakakibara et al. |
| 2014/0357179 | A1 | 12/2014 | Londiche et al. |

FOREIGN PATENT DOCUMENTS

| | | | |
|---|---|---|---|
| DE | 102011003435 A1 | 8/2012 | |
| EP | 1331116 A2 | 7/2003 | |
| FR | 2772311 | * 12/1997 | ............... B60H 1/34 |
| FR | 2872260 A1 | 12/2005 | |

* cited by examiner

AIR VENT

TECHNICAL FIELD

The invention relates to an air vent.

BACKGROUND

Various air vents are known from the prior art. By way of example, DE 10 2006 032587 A1 discloses an air vent device for vehicles that comprises an air channel, which, as viewed in a longitudinal or vertical section, has a first upper wall region and an opposite second, lower wall region and which is in fluid connection via an air outlet opening to a passenger compartment of the vehicle. Air can be conveyed into the passenger compartment via the air channel and the air outlet opening. At least one lamella-like air-conveying element is arranged between the two wall regions in the region or in the vicinity of the air outlet opening.

Furthermore, DE 10 2007 019 602 B3 discloses an air vent having a conical air-conveying element, of which the pointed side points towards the air discharge opening. Furthermore, the air vent comprises laminar elements, which are arranged between the surface of the air-conveying element and the surface of the nozzle housing. The nozzle housing and the air-conveying element are configured to produce the Coandä effect, such that a directed air jet exits from the air discharge opening.

Lastly, FR 2 872 260 A1 presents a fan having an air channel, of which the mouth defines a discharge opening. A convex air-guiding element is arranged movably in the air channel, whereby the cross section of the air discharge and the direction of the exiting air can be changed.

SUMMARY

In accordance with one aspect of the invention, there is provided an air vent including a housing, a first air-conveying surface located in the housing, a second air-conveying surface located in the housing, and an air flow adjusting element located in the housing. The housing has an inlet end, an opposite discharge end, and an inner wall located between said ends. The first air-conveying surface faces toward and is spaced away from the inner wall to at least partially define a first air channel configured to guide a first volumetric flow of air through the housing from the inlet end to an air discharge opening at the discharge end of the housing. The second air-conveying surface faces toward and is spaced away from the inner wall to at least partially define a second air channel configured to guide a second volumetric flow of air through the housing from the inlet end to the air discharge opening separately from the first volumetric flow of air. The first and second air channels are arranged so that the first and second volumetric air flows exit the housing at the air discharge opening in respective intersecting directions and collide after exiting the housing. The air flow adjusting element is movable to change a ratio of the first volumetric flow to the second volumetric flow, and each of the first and second air-conveying surfaces is in a fixed position with respect to the housing.

In one or more embodiments of the air vent, the air flow adjusting element is located in the housing between the inlet end and the first and second air-conveying surfaces and is moveable to change the first volumetric flow of air and/or the second volumetric flow of air to change said ratio.

In one or more embodiments, the air vent includes an air-conveying element that includes the first and second air-conveying surfaces and a transition region at an end of the air-conveying element facing the inlet end of the housing. The air flow adjusting element is arranged at said end of the air conveying element and bears against the transition region.

In one or more embodiments of the air vent, the air flow adjusting element has a symmetrical shape tapering in the direction of the inlet end of the housing and has a shape that is complementary to the transition region where bearing against the transition region.

In one or more embodiments of the air vent, one or both of said air-conveying surfaces has a bulge and the housing has a corresponding bulge formed in the same direction where the respective air-conveying surfaces oppose the inner wall of the housing across the respective air channel.

In one or more embodiments of the air vent, the housing has an axis extending between the inlet end and the discharge end, the first and second air-conveying surfaces face in opposite directions, and each bulge is formed in a direction perpendicular with said axis.

In one or more embodiments of the air vent, the air flow adjusting element is movable between a first position, in which the first air channel is blocked by the air flow adjusting element, and a second position, in which the second air channel is blocked by the air flow adjusting element.

In one or more embodiments, the air vent includes a light source located in the housing between the air discharge opening and the air flow adjusting element.

In one or more embodiments of the air vent, the air flow adjusting element is pivotable about a pivot axis, and the air vent includes a set of wings. Each wing is pivotable about a different axis perpendicular to said pivot axis, whereby a flow direction of air that flows into the housing from the inlet end can be can be adjusted by pivotable movement of the set of wings.

In one or more embodiments of the air vent, the set of wings is located between the air flow adjusting element and the inlet end of the housing.

In one or more embodiments, the air vent includes a closure element located between the inlet end of the housing and the air flow adjusting element. The closure element is movable between an open position, in which air flow is permitted along an air passage between the inlet and discharge ends, and a closed position, in which air flow along the air passage is blocked.

In one or more embodiments of the air vent, the closure element comprises a plurality of plates that are hinged via a common pivot pin on the housing and movement of the closure element between the open position and the closed position is provided via rotation of the plates about the pivot pin.

In one or more embodiments, the air vent includes a manipulator at the discharge end of the housing, the manipulator being moveable between a first direction and a second direction. The manipulator is mechanically coupled to the air flow adjusting element via a first coupling configured to convert movement of the manipulator in the first or second direction to movement of the air flow adjustment element in the first or second direction.

In one or more embodiments of the air vent, the first coupling comprises a first coupling rod coupled to the manipulator for pivotable movement about a first pivot axis and a second coupling rod coupled to the air flow adjustment element for pivotable movement about a second pivot axis.

The first coupling rod and the second coupling rod are mechanically coupled to each another via a first sliding guide block.

In one or more embodiments, the air vent includes a set of wings. Each wing is pivotable about an axis perpendicular to a pivot axis of the air flow adjusting element, and the manipulator is mechanically coupled to the set of wings via a second coupling configured to convert a movement of the manipulator in a direction perpendicular to the first direction to pivoting movement of the set of wings.

In one or more embodiments of the air vent, the second coupling comprises a third coupling rod coupled to at least one of the wings of the set of wings. The first coupling rod and the third coupling rod are mechanically coupled via a second sliding guide block to transmit force between the first coupling rod and the third coupling rod. The first sliding guide block is configured to allow movement of the first coupling rod relative to the second coupling rod in the direction perpendicular to the first direction.

In one or more embodiments of the air vent, the first coupling is located between the first and second air-conveying surfaces within an air-conveying element that includes the first and second air-conveying surfaces.

In one or more embodiments of the air vent, the second air-conveying surface is symmetric to the first air-conveying surface.

In one or more embodiments, the air vent includes an air-conveying element that includes the first and second air-conveying surfaces. The air-conveying element has a cross-section with a truncated egg shape.

In one or more embodiments of the air vent, the inner wall of the housing has a rectangular cross-section at least at the inlet end of the housing.

It is envisaged that any one or more of the above-described embodiments and/or the individual elements thereof can be combined with one another, provided the combinations are not mutually exclusive.

BRIEF DESCRIPTION OF THE DRAWINGS

Embodiments of the invention will be explained in greater detail hereinafter with reference to the drawings, wherein similar elements will be denoted by like reference numerals, and wherein.

DETAILED DESCRIPTION

Figure 1:
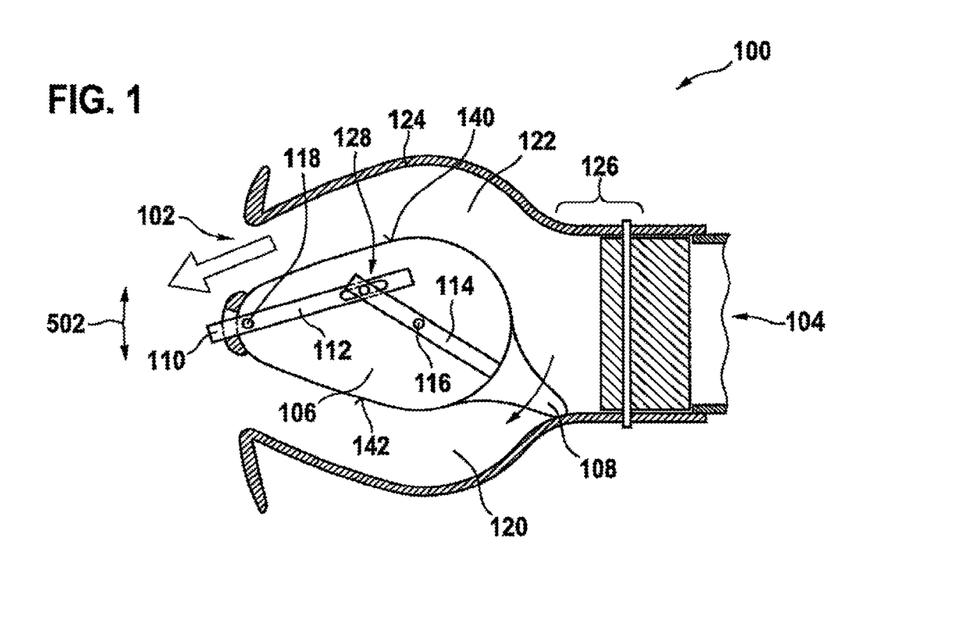
FIG. 1 shows a schematic view of the air vent.

FIG. 1 shows a cross-sectional view of an air vent 100 having a housing 124, an air inlet opening 104 located in the axial direction with respect to the housing 124, and an air discharge opening 102 axially opposite the air inlet opening. An egg-shaped air-conveying element 106 with air-conveying surfaces 140 and 142 opposite one another as viewed in the vertical direction are located in the housing 124. The air-conveying surfaces 140 and 142 are distanced here from the inner walls of the housing 124. An air channel 122 is thus created between the air-conveying surface 140 and the inner wall of the housing, and an air channel 120 is thus created between the air-conveying surface 142 and the inner wall of the housing 124. An airflow can be transported from the air inlet opening 104 to the air discharge opening 102 through the air channels 120 and 122.

Further, a wing 108 is arranged movably on the side of the air-conveying element 106 facing the air inlet opening 104. This wing 108 is pivotable here between different positions about the rear face of the air-conveying element 106, as can be seen in the comparison between FIGS. 1 and 2. In FIG. 1 the air-conveying element is pivoted fully downwardly, and in FIG. 2 the air-conveying element is pivoted fully upwardly. As a result of this, in FIG. 1 air flows exclusively through the air channel 122, whereas the air channel 120 is blocked by the air-conveying element 108. By contrast, in FIG. 2 air flows exclusively through the air channel 120, whereas the air channel 122 is blocked by the wing 108. As is indicated by the corresponding arrows in FIGS. 1 and 2, this means that in FIG. 1 an airflow directed downwardly exits from the air discharge opening 102. By contrast, the airflow is directed upwardly in FIG. 2. Due to the egg shape of the air-conveying element 106 and the inner walls of the housing 124 running parallel thereto, the purposeful directing of the airflow is intensified.

Figure 2:
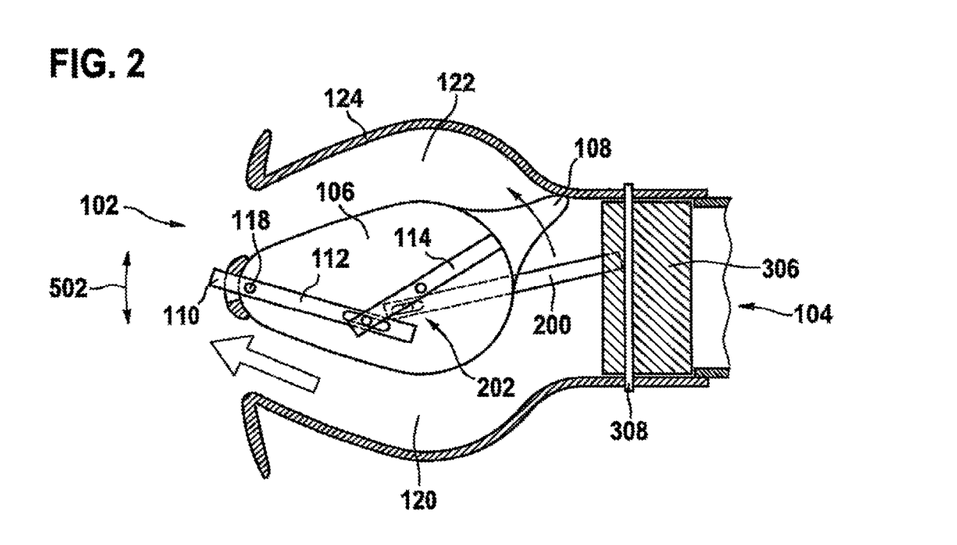
FIG. 2 shows a further schematic view of the air vent of FIG. 1.

If the wing 108 is located in a position between the two positions shown in FIGS. 1 and 2, that is to say if the wing 108 is located in a horizontal position parallel to the axis of the housing 124, an airflow is thus conveyed simultaneously through the air channels 120 and 122. As a result, an airflow that is directed substantially straight ahead is thus produced on the air outlet side 102.

As can be seen in FIGS. 1 and 2, the rear face of the wing 108 bears closely against the rear face of the air-conveying element 106. In the transition region, in which the first air-conveying surface 140 transitions into the second air-conveying surface 142 on the side facing the air inlet opening 104, the wing 108 bears fully against the transition region, preferably without any gaps. Said transition region and therefore the rear face of the air-conveying element 106 and the rear face of the wing 108 are thus formed in a complementary manner.

The wing 108 has a geometric shape tapering in the direction of the air inlet side 104, wherein this shape simultaneously corresponds to a streamlined shape. Since there is a practically seamless transition between the wing 108 and the air-conveying surfaces 140 and 142, the air resistance when air flows over the wing 108 or around the wing 108 can be minimised.

Due to the egg shape of the air-conveying element 106, the air-conveying surfaces 140 and 142 have corresponding bulges, wherein the walls of the housing 124 follow this shape of the bulges in parallel and at a distance. Due to these bulges, it could be ensured in a particular way that the airflow exiting from the air outlet opening 102 is purposefully directed.

As viewed in the axial direction of extension of the housing 124, the housing has a region 126, in which is has practically a rectangular inner shape. Since, in addition (not visible in FIGS. 1 and 2), the wing 108 has a plane of symmetry that extends in FIGS. 1 and 2 inter alia in the plane of the drawing, the wing 108 can bear fully against the inner wall of the housing 124 in the stop positions shown in FIGS. 1 and 2. More specifically, the inner wall is thus sealed off fully to the left and right by the wing 108. Since, in addition, as viewed in the vertical direction, the air channel 120 or 122 is also fully closed in the stop positions as shown in FIGS. 1 and 2, it is ensured that a maximum airflow can be made possible through the remaining open air channel 120 or 122 respectively.

In order to then pivot the wing 108 between the end stop positions shown in FIGS. 1 and 2, a coupling is provided, which connects a manipulator 110 to the wing 108. The manipulator 110 is located here on the front face of the air-conveying element 106, that is to say on the air outlet side 102. A coupling rod 112 is mounted fixedly on the housing 124 and therefore fixedly on the air-conveying element 106 at a pivot point, for example a pin 118. The same is true in respect of a coupling rod 114, which is connected rigidly to the wing 108 and which is likewise mounted via a pin 116 on the housing 124 or the air-conveying element 106. The two coupling rods 112 and 114 are mechanically coupled to one another via a sliding block guide 128. If the manipulator 110 is now moved in the direction 502, that is to say substantially in the vertical direction of the air vent 100, this thus leads to a corresponding rotational movement of the wing 108 about the pin 116 due to the coupling rods 112 and 114. If the manipulator is thus moved downwardly as in FIG. 1 for example, this thus also leads simultaneously to a movement of the wing 108, likewise downwardly.

For the sake of clarity only one further coupling rod 200 is indicated in FIG. 2 and is connected via a further sliding block guide 202 to the coupling rod 112. This coupling rod 200 is connected to at least one further wing 306, wherein the wing 306 is arranged in the air inlet region 104 of the housing 124. This wing is normally constituted by a set of wings 306, which are all mechanically coupled to one another. These wings 306 can be rotated about a pin 308 in the horizontal direction of the air vent 100. It is thus made possible for an airflow flowing through the housing to be directed purposefully in the horizontal direction.

So that the movement of the manipulator 110 in the vertical direction 502 discussed with regard to FIGS. 1 and 2 does not lead to an undesired change of the horizontal position of the wing(s) 306, the coupling rod 200 is connected via a further sliding block guide 202 to the coupling rod 112. This sliding block guide 202 is configured here such that a movement of the coupling rods 112 and 200 in the direction 502, that is to say in the vertical direction, is possible without hindrance, without this leading to a transmission of force between the coupling rods 112 or 200. Only with a movement of the manipulator 110 into the plane of the drawing or out from the plane of the drawing, that is to say in the horizontal direction, is a force transmitted from the manipulator via the coupling rod 112 to the coupling rod 200 and therefore to the wing(s) 306 due to the sliding block guide. This leads to a pivoting of the wing 306 about the pin 308.

Figure 3:
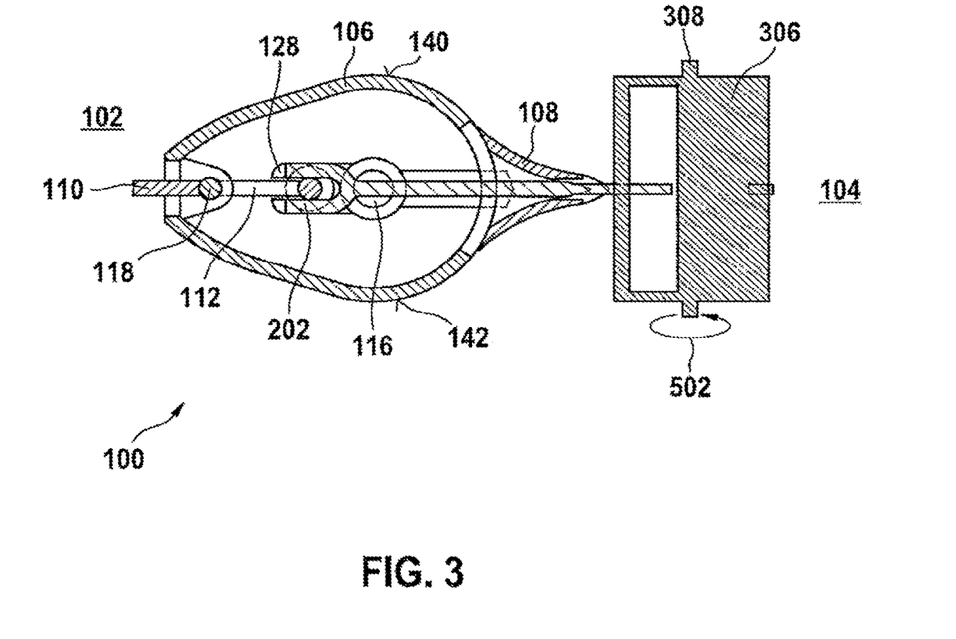
FIG. 3 shows a side sectional view of an air vent.

FIG. 3 shows a cross-sectional view of a further air vent 100, which is identical in terms of function to the air vent discussed with regard to FIGS. 1 and 2. Accordingly, identical reference signs have also been chosen. Due to the manipulator 110 and the integration thereof into the housing 124 (not shown in greater detail), the egg shape of the air-conveying element 106, which is housed rigidly with respect to the housing, is blunted. The air-conveying element 106 thus has, on the air outlet side 102, a flattened portion, to which the manipulator 110 is attached. As can be seen clearly in FIG. 3, all mechanical components necessary for the movement of the wing 108 are housed fully in the air-conveying element 106. The air flowing over the air-conveying element therefore is not influenced by said mechanical components.

Further, the sliding block guides 128 and 202 can be seen slightly more clearly and are provided in the present example in the form of stacked recesses in the coupling rods 200 and 114, with which complementary pins of the coupling rod 112 engage.

Figure 4:
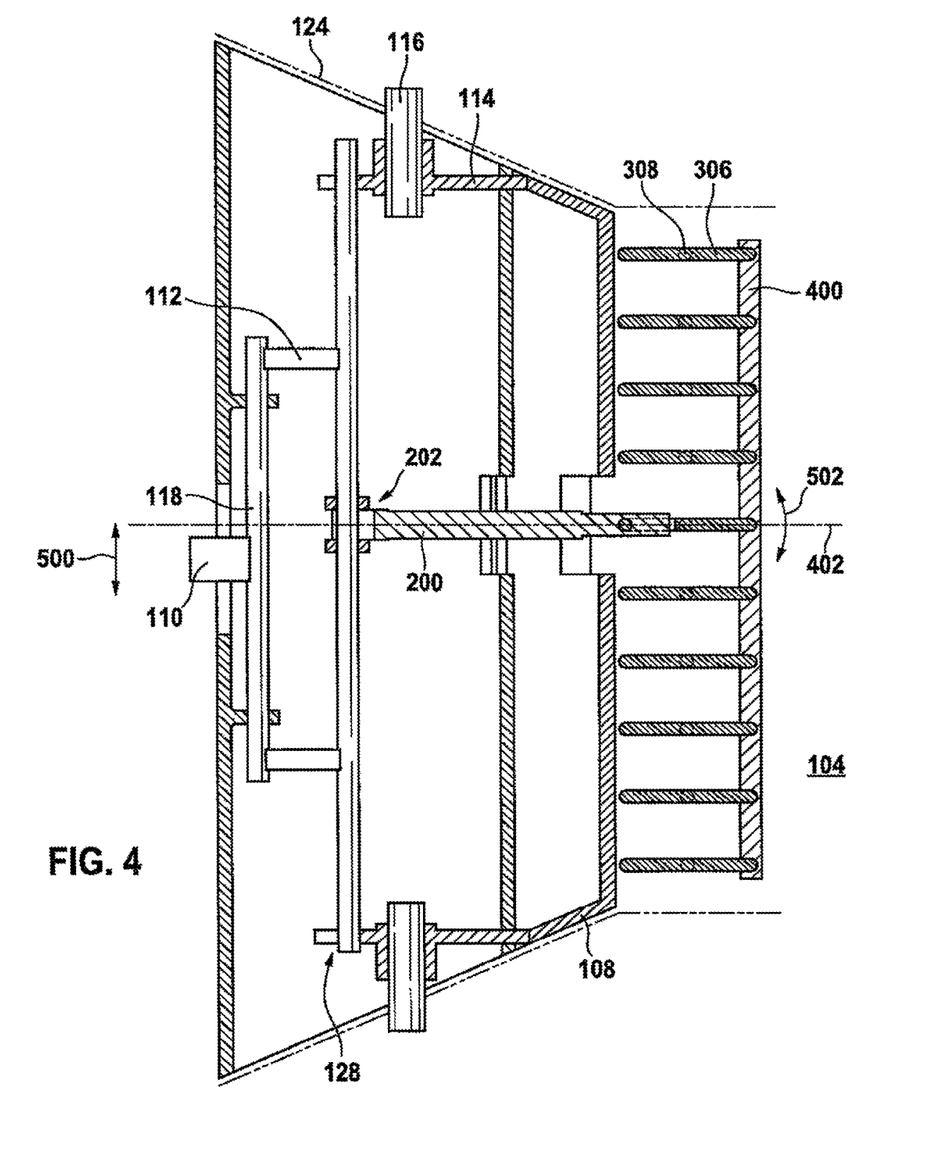
FIG. 4 shows a sectional view of the air vent of FIG. 3 as viewed from above.

FIG. 4 shows a sectional view of the air vent 100 of FIG. 3, as viewed from above, wherein the plurality of wings 306 in the air inlet region 104 are now visible. Each of these individual wings 306 is mounted rotatably about a vertical pin 308, wherein the wings are coupled via a common mechanical coupling 400. It is therefore sufficient for the coupling rod 200 to act merely on one of the wings 306 (the middle wing 306 in the example of FIG. 4). A transmission of force from the manipulator 110 via the coupling rod 112 and the coupling rod 200 to this middle wing 306 causes this wing and also all further wings 306 to be rotated about the pin 308.

For example, the manipulator 110 can be shifted in the horizontal direction 500, which causes a torque to be transmitted to the wing 306 via the coupling rod 112, the sliding block guide 202 and the coupling rod 200. The wings thus pivot about the pins 308 thereof in the direction 502, which means that the airflow can be steered in the horizontal direction of the air vent.

Figure 5:
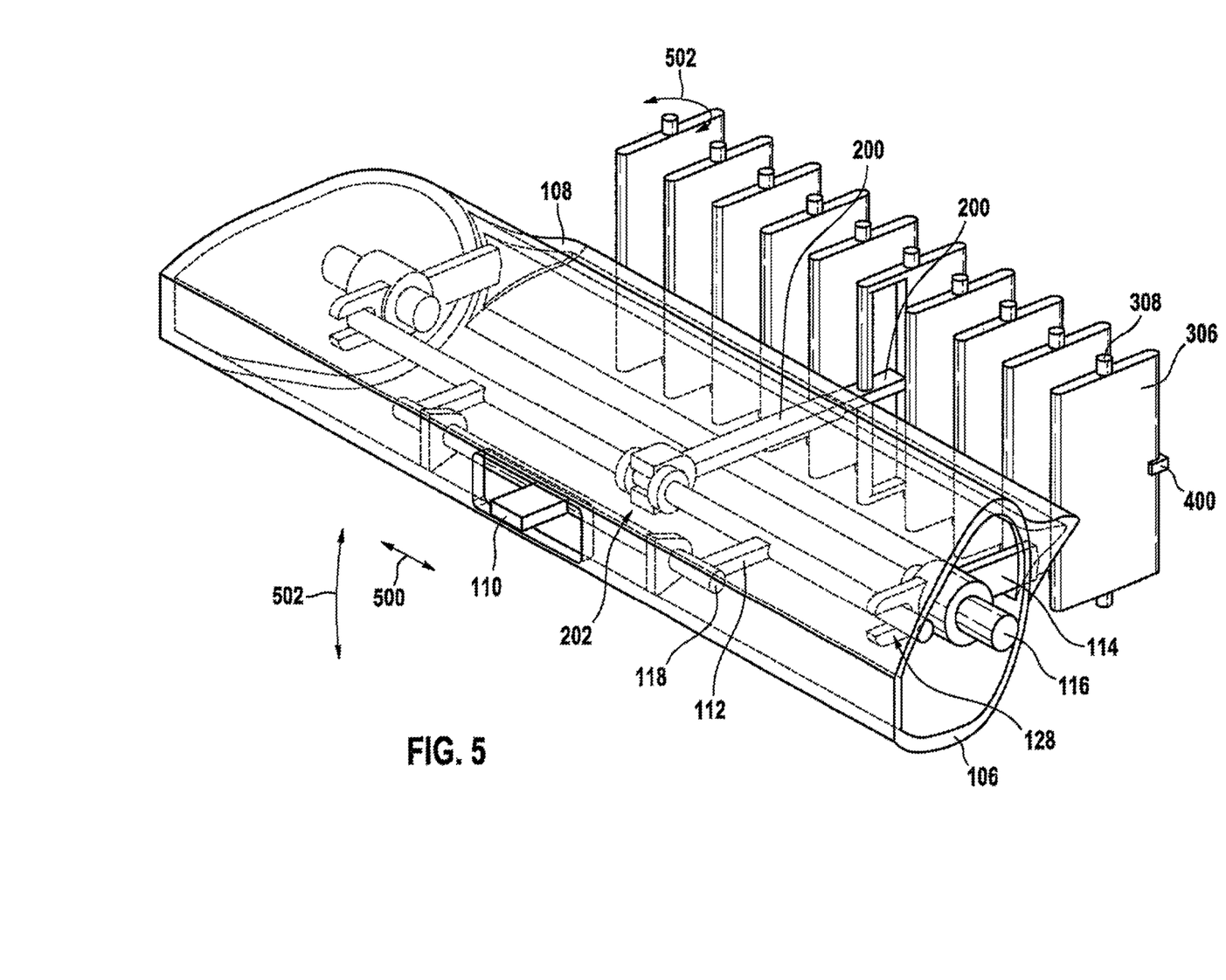
FIG. 5 shows a perspective view of the air vent of FIG. 3.

In the perspective view of FIG. 5, the air vent in FIGS. 3 and 4 is shown again in greater detail. A movement of the manipulator 110 in the horizontal direction, that is to say in the direction 500, means that the coupling rod 112 mounted horizontally displaceably along the pin 118 can likewise be displaced in the horizontal direction 500. The sliding block guide is formed by a fork-shaped seat of the coupling rod 114, wherein the coupling rod 112 engages with this seat. The coupling rod 112 is thus displaceable in the horizontal direction 500 in the link. This means that, with a purely horizontal movement of the manipulator 110, no force is transmitted to the wing 108.

By contrast, the sliding block guide 102 is configured such that the coupling rod 200 is connected to the coupling rod 112 such that the horizontal movement in the direction 500 also leads to a corresponding horizontal movement of the coupling rod 200. However, since this is connected to the wing 306 and the wing 306 is mounted pivotably about the vertical pin 308, the horizontal movement in the direction 500 leads to a pivoting movement 502 of the wing 306.

A vertical or slightly circular movement of the manipulator 110 upwardly or downwardly in the direction 502 leads to a rotation of the coupling rod 112 about the pin 118. Due to the sliding block guide 202, however, the coupling rod 112 will rotate here merely in the fork-shaped link of the coupling rod 200, without this resulting in a movement of the wing 306. Where applicable, the coupling rod 200 can be configured such that it can follow a slight movement, which may or may not be provided, of the coupling rod 112 in the vertical direction in a compensatory manner.

The sliding block guide 128, by contrast, is then embodied such that the tilting movement of the coupling rod 112 about the pin 118 leads to a transmission of force from the coupling rod 112 to the coupling rod 114. The coupling rod 114 rotates here about its pin 116. This, in turn, causes the wing 108 arranged on the coupling rod 114 to be moved on the rear side of the air-conveying element 106. As already described above, it is thus possible to steer the airflow in the vertical direction of the air vent.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An air vent, comprising:
a housing having an inlet end, an opposite discharge end, and an inner wall located between said ends;
a first air-conveying surface located in the housing, the first air-conveying surface facing toward and being spaced away from the inner wall to at least partially define a first air channel configured to guide a first volumetric flow of air through the housing from the inlet end to an air discharge opening at the discharge end of the housing;
a second air-conveying surface located in the housing, the second air-conveying surface facing toward and being spaced away from the inner wall to at least partially define a second air channel configured to guide a second volumetric flow of air through the housing from the inlet end to the air discharge opening separately from the first volumetric flow of air, wherein the first and second air channels are arranged so that the first and second volumetric air flows exit the housing at the air discharge opening in respective intersecting directions and collide after exiting the housing; and
an air flow adjusting element located in the housing and being movable to change a ratio of the first volumetric flow to the second volumetric flow, wherein each of the first and second air-conveying surfaces is in a fixed position with respect to the housing,
wherein the air flow adjusting element is movable between a first position, in which the first air channel is blocked by the air flow adjusting element, and a second position, in which the second air channel is blocked by the air flow adjusting element,
wherein the second air-conveying surface is symmetric to the first air-conveying surface.

2. The air vent as defined in claim 1, wherein the air flow adjusting element is located in the housing between the inlet end and the first and second air-conveying surfaces and is moveable to change the first volumetric flow of air and/or the second volumetric flow of air to change said ratio.

3. The air vent as defined in claim 1, further comprising an air-conveying element that includes the first and second air-conveying surfaces and a transition region at an end of the air-conveying element facing the inlet end of the housing, wherein the air flow adjusting element is arranged at said end of the air-conveying element and bears against the transition region.

4. The air vent as defined in claim 3, wherein the air flow adjusting element has a symmetrical shape tapering in the direction of the inlet end of the housing and has a shape that is complementary to the transition region where bearing against the transition region.

5. The air vent as defined in claim 1, wherein one or both of said air-conveying surfaces has a bulge and the housing has a corresponding bulge formed in the same direction where the respective air-conveying surfaces oppose the inner wall of the housing across the respective air channel.

6. The air vent as defined in claim 5, wherein the housing has an axis extending between the inlet end and the discharge end, the first and second air-conveying surfaces face in opposite directions, and each bulge is formed in a direction perpendicular with said axis.

7. The air vent as defined in claim 1, further comprising a light source located in the housing between the air discharge opening and the air flow adjusting element.

8. The air vent as defined in claim 1, further comprising a closure element located between the inlet end of the housing and the air flow adjusting element, wherein the closure element is movable between an open position, in which air flow is permitted along an air passage between the inlet and discharge ends, and a closed position, in which air flow along the air passage is blocked.

9. The air vent as defined in claim 8, wherein the closure element comprises a plurality of plates that are hinged via a common pivot pin on the housing and movement of the closure element between the open position and the closed position is provided via rotation of the plates about the pivot pin.

10. The air vent as defined in claim 1, further comprising a manipulator at the discharge end of the housing, the manipulator being moveable between a first direction and a second direction, wherein the manipulator is mechanically coupled to the air flow adjusting element via a first coupling configured to convert movement of the manipulator in the first or second direction to movement of the air flow adjustment element in the first or second direction.

11. The air vent as defined in claim 10, wherein the first coupling comprises a first coupling rod coupled to the manipulator for pivotable movement about a first pivot axis and a second coupling rod coupled to the air flow adjustment element for pivotable movement about a second pivot axis, the first coupling rod and the second coupling rod being mechanically coupled to each another via a first sliding guide block.

12. The air vent as defined in claim 11, further comprising a set of wings, each wing being pivotable about an axis perpendicular to a pivot axis of the air flow adjusting element, wherein the manipulator is mechanically coupled to the set of wings via a second coupling configured to convert a movement of the manipulator in a direction perpendicular to the first direction to pivoting movement of the set of wings.

13. The air vent as defined in claim 12, wherein the second coupling comprises a third coupling rod coupled to at least one of the wings of the set of wings, the first coupling rod and the third coupling rod being mechanically coupled via a second sliding guide block to transmit force between the first coupling rod and the third coupling rod, wherein the first sliding guide block is configured to allow movement of the first coupling rod relative to the second coupling rod in the direction perpendicular to the first direction.

14. The air vent as defined in claim 10, wherein the first coupling is located between the first and second air-conveying surfaces within an air-conveying element that includes the first and second air-conveying surfaces.

15. The air vent as defined in claim 1, further comprising an air-conveying element that includes the first and second air-conveying surfaces, wherein the air-conveying element has a cross-section with a truncated egg shape.

16. The air vent as defined in claim 1, wherein the inner wall of the housing has a rectangular cross-section at least at the inlet end of the housing.

17. An air vent, comprising:
a housing having an inlet end, an opposite discharge end, and an inner wall located between said ends;
a first air-conveying surface located in the housing, the first air-conveying surface facing toward and being spaced away from the inner wall to at least partially define a first air channel configured to guide a first volumetric flow of air through the housing from the inlet end to an air discharge opening at the discharge end of the housing;
a second air-conveying surface located in the housing, the second air-conveying surface facing toward and being spaced away from the inner wall to at least partially define a second air channel configured to guide a second volumetric flow of air through the housing from the inlet end to the air discharge opening separately from the first volumetric flow of air, wherein the first and second air channels are arranged so that the first and second volumetric air flows exit the housing at the air discharge opening in respective intersecting directions and collide after exiting the housing; and
an air flow adjusting element located in the housing and being movable to change a ratio of the first volumetric flow to the second volumetric flow, wherein each of the first and second air-conveying surfaces is in a fixed position with respect to the housing,
wherein the air flow adjusting element is pivotable about a pivot axis, the air vent further comprising a set of wings, each wing being pivotable about a different axis perpendicular to said pivot axis, whereby a flow direction of air that flows into the housing from the inlet end can be can be adjusted by pivotable movement of the set of wings.

18. The air vent as defined in claim 17, wherein the air flow adjusting element is movable between a first position, in which the first air channel is blocked by the air flow adjusting element, and a second position, in which the second air channel is blocked by the air flow adjusting element.

19. The air vent as defined in claim 17, wherein the set of wings is located between the air flow adjusting element and the inlet end of the housing.

20. The air vent as defined in claim 17, wherein the second air-conveying surface is symmetric to the first air-conveying surface.

* * * * *